United States Patent
Chung et al.

(10) Patent No.: US 9,178,253 B2
(45) Date of Patent: Nov. 3, 2015

(54) BATTERY PACK HAVING NOVEL COOLING STRUCTURE

(75) Inventors: Chae Ho Chung, Daejeon (KR); Jae Hun Yang, Daejeon (KR); Dal Mo Kang, Daejeon (KR); Ye Hoon Im, Daejeon (KR)

(73) Assignee: LG CHEM, LTD., Seoul (KR)

( * ) Notice: Subject to any disclaimer, the term of this patent is extended or adjusted under 35 U.S.C. 154(b) by 185 days.

(21) Appl. No.: 13/391,033

(22) PCT Filed: Aug. 18, 2010

(86) PCT No.: PCT/KR2010/005445
§ 371 (c)(1),
(2), (4) Date: Apr. 4, 2012

(87) PCT Pub. No.: WO2011/021843
PCT Pub. Date: Feb. 24, 2011

(65) Prior Publication Data
US 2012/0183822 A1    Jul. 19, 2012

(30) Foreign Application Priority Data
Aug. 20, 2009 (KR) .............. 10-2009-0077032

(51) Int. Cl.
| | |
|---|---|
| *H01M 10/656* | (2014.01) |
| *H01M 2/10* | (2006.01) |
| *H01M 10/625* | (2014.01) |
| *H01M 10/6563* | (2014.01) |
| *H01M 10/647* | (2014.01) |
| *H01M 10/652* | (2014.01) |
| *H01M 10/617* | (2014.01) |
| *H01M 10/6566* | (2014.01) |
| *H01M 10/613* | (2014.01) |

(52) U.S. Cl.
CPC ........ *H01M 10/5061* (2013.01); *H01M 2/1072* (2013.01); *H01M 10/613* (2015.04); *H01M 10/617* (2015.04); *H01M 10/625* (2015.04); *H01M 10/647* (2015.04); *H01M 10/652* (2015.04); *H01M 10/656* (2015.04); *H01M 10/6563* (2015.04); *H01M 10/6566* (2015.04)

(58) Field of Classification Search
None
See application file for complete search history.

(56) References Cited

U.S. PATENT DOCUMENTS

| | | |
|---|---|---|
| 6,606,245 B2 | 8/2003 | Oda et al. |
| 2002/0028375 A1 | 3/2002 | Morishita et al. |
| 2006/0028183 A1* | 2/2006 | Izawa et al. ............ 320/150 |
| 2008/0026284 A1* | 1/2008 | Fujii ....................... 429/120 |

FOREIGN PATENT DOCUMENTS

| | | |
|---|---|---|
| CN | 1905268 A | 1/2007 |
| EP | 1750322 A2 | 2/2007 |
| EP | 1753068 A1 | 2/2007 |
| EP | 1753069 A1 | 2/2007 |
| JP | 2007-42647 A | 2/2007 |

(Continued)

OTHER PUBLICATIONS

PCT/ISA/210—International Search Report mailed Apr. 29, 2011 issued in PCT/KR2010/005445.

*Primary Examiner* — Alix Eggerding
(74) *Attorney, Agent, or Firm* — Birch, Stewart, Kolasch & Birch, LLP (57) ABSTRACT

Disclosed herein is a battery pack having a plurality of battery cells or unit modules ('unit cells'), which can be charged and discharged, mounted in a pack case.

20 Claims, 7 Drawing Sheets

(56) References Cited

FOREIGN PATENT DOCUMENTS

| | | |
|---|---|---|
| JP | 2008-34297 A | 2/2008 |
| KR | 10-2001-0059123 A | 7/2001 |
| KR | 10-0456349 B1 | 11/2004 |
| KR | 10-2005-0007648 A | 1/2005 |
| KR | 10-2005-0070727 A | 7/2005 |
| WO | WO 2007/114615 A1 | 10/2007 |

* cited by examiner

BATTERY PACK HAVING NOVEL COOLING STRUCTURE

TECHNICAL FIELD

The present invention relates to a battery pack having a novel cooling structure, and, more particularly, to a battery pack having a plurality of battery cells or unit modules ('unit cells'), which can be charged and discharged, mounted in a pack case, wherein the unit cells are stacked in a direction (a Z direction) in which the unit cells are sequentially stacked in parallel to a ground in a state in which a spacing distance for coolant flow is provided between the respective unit cells to constitute a battery module, two or more battery modules are arranged in a horizontal direction (an X direction) on the plane with respect to a coolant introduction direction in which a coolant is introduced through a coolant inlet port in a state in which flow of the coolant between the battery modules is restrained to constitute a battery module group, the pack case is provided with a flow space ('a coolant introduction part') extending from the coolant inlet port to the battery module group and another flow space ('a coolant discharge part') extending from the battery module group to a coolant outlet port, and a coolant flow channel defined between the coolant introduction part and the coolant discharge part is configured to have a structure in which the coolant, introduced through the coolant introduction part, cools the battery modules while passing through the specific battery modules in a vertical direction (a Y direction) on the plane and is discharged through the coolant discharge part.

BACKGROUND ART

Recently, a secondary battery, which can be charged and discharged, has been widely used as an energy source for wireless mobile devices. Also, the secondary battery has attracted considerable attention as a power source for electric vehicles (EV) and hybrid electric vehicles (HEV), which have been developed to solve problems, such as air pollution, caused by existing gasoline and diesel vehicles using fossil fuel.

Small-sized mobile devices use one or several battery cells for each device. On the other hand, middle or large-sized devices, such as vehicles, use a middle or large-sized battery module having a plurality of battery cells electrically connected to each other because high power and large capacity are necessary for the middle or large-sized devices.

Preferably, the middle or large-sized battery module is manufactured so as to have as small a size and weight as possible. For this reason, a prismatic battery or a pouch-shaped battery, which can be stacked with high integration and has a small weight to capacity ratio, is usually used as a battery cell of the middle or large-sized battery module. In particular, much interest is currently generated in the pouch-shaped battery, which uses an aluminum laminate sheet as a sheathing member, because the pouch-shaped battery is lightweight, the manufacturing cost of the pouch-shaped battery is low, and it is easy to modify the shape of the pouch-shaped battery.

In order for the middle or large-sized battery module to provide power and capacity required by a predetermined apparatus or device, it is necessary for the middle or large-sized battery module to be configured to have a structure in which a plurality of battery cells is electrically connected in series to each other, and the battery cells are stable against external force.

Also, the battery cells constituting the middle or large-sized battery module are secondary batteries which can be charged and discharged. Consequently, a large amount of heat is generated from the high-power, large-capacity secondary battery during the charge and discharge of the secondary battery. If the heat, generated from the unit cells during the charge and discharge of the unit cells, is not effectively removed, the heat accumulates in the respective unit cells with the result that deterioration of the unit cells is accelerated. According to circumstances, the unit cells may catch fire or explode. For this reason, a cooling system is needed in a battery pack for vehicles, which is a high-power, large-capacity battery, to cool battery cells mounted in the battery pack.

Meanwhile, a conventional battery pack is configured to have a structure in which a plurality of battery cells is stacked in one direction or a lateral direction so that the battery cells are arranged in the stacked direction. The battery pack is generally formed in the shape of a rectangular parallelepiped, which can be properly installed in a trunk of a vehicle or a space under a seat of the vehicle.

Since the structure of the conventional battery pack is generally formed in the shape of the rectangular parallelepiped, however, it is difficult to install the battery pack when the battery pack is installed is the lower part of the vehicle.

Therefore, there is a high necessity for a battery pack that can be easily installed even when a battery pack installation space is the lower part of a vehicle and that has a cooling structure to uniformly maintain internal temperature of the battery pack.

DISCLOSURE

Technical Problem

Therefore, the present invention has been made to solve the above problems, and other technical problems that have yet to be resolved.

As a result of a variety of extensive and intensive studies and experiments on a middle or large-sized battery pack case, the inventors of the present application have found that, when a battery pack is generally formed to have a plate-shaped structure, it is possible to install the battery pack in the lower part of a vehicle, thereby improving convenience of installation while increasing an interior space of the vehicle.

Also, the inventors have found that, when a coolant flow channel defined between a coolant introduction part and a coolant discharge part is configured to have a structure in which a coolant, introduced through the coolant introduction part, cools battery modules while passing through the specific battery modules in a vertical direction (a Y direction) on the plane and is discharged through the coolant discharge part, it is possible to uniformly distribute the coolant flowing in flow channels defined between battery cells, thereby effectively removing heat accumulating between the battery cells and greatly improving the performance and life span of the battery cells. The present invention has been completed based on these findings.

Technical Solution

In accordance with one aspect of the present invention, the above and other objects can be accomplished by the provision of a battery pack having a plurality of battery cells or unit modules ('unit cells'), which can be charged and discharged, mounted in a pack case, wherein the unit cells are stacked in a direction (a Z direction) in which the unit cells are sequentially stacked in parallel to a ground in a state in which a spacing distance for coolant flow is provided between the respective unit cells to constitute a battery module, two or more battery modules are arranged in a horizontal direction (an X direction) on the plane with respect to a coolant introduction direction in which a coolant is introduced through a coolant inlet port in a state in which flow of the coolant between the battery modules is restrained to constitute a battery module group, the pack case is provided with a flow space ('a coolant introduction part') extending from the coolant inlet port to the battery module group and another flow space ('a coolant discharge part') extending from the battery module group to a coolant outlet port, and a coolant flow channel defined between the coolant introduction part and the coolant discharge part is configured to have a structure in which the coolant, introduced through the coolant introduction part, cools the battery modules while passing through the specific battery modules in a vertical direction (a Y direction) on the plane and is discharged through the coolant discharge part.

That is, in the battery pack according to the present invention, the unit cells are stacked in a direction (a Z direction) in which the unit cells are sequentially stacked in parallel to a ground in a state in which a spacing distance for coolant flow is provided between the respective unit cells to constitute a battery module, unlike the structure of a conventional battery pack. Although the coolant is not uniformly introduced to the outermost portion of the coolant introduction part, therefore, the deviation in temperature of the unit cells is relatively low.

Also, two or more battery modules are arranged in a horizontal direction (an X direction) on the plane with respect to a coolant introduction direction in which a coolant is introduced through a coolant inlet port in a state in which flow of the coolant between the battery modules is restrained to constitute a battery module group. Consequently, it is possible to configure the battery pack to have a plate-shaped structure, and therefore, it is possible to install the battery pack in the lower part of a vehicle, thereby increasing the interior space of the vehicle.

In addition, a coolant flow channel defined between the coolant introduction part and the coolant discharge part is configured to have a structure in which the coolant, introduced through the coolant introduction part, cools the battery modules while passing through the specific battery modules in a vertical direction (a Y direction) on the plane and is discharged through the coolant discharge part. As a result, it is possible to uniformly distribute the coolant flowing in flow channels defined between the battery cells (the batter cells or the unit modules). Consequently, it is possible to effectively remove heat generated during charge and discharge of the battery cells through uniform flow of the coolant, thereby increasing cooling efficiency and improving performance of the unit cells.

For reference, directions described in this specification are defined based on the coolant introduction direction in which the coolant is introduced through the coolant inlet port. For example, a horizontal direction on the plane is interpreted as being equal to an X direction, and a vertical direction on the plane is interpreted as being equal to a Y direction. Also, a direction in which battery cells are sequentially stacked in parallel to the ground is interpreted as being equal to a Z direction.

Each of the battery modules constituting the battery pack according to the present invention is manufactured by stacking a plurality of unit cells with high density. Each of the battery modules is configured to have a structure in which the unit cells are stacked in a direction (a Z direction) in which the unit cells are sequentially stacked in parallel to the ground in a state in which the neighboring unit cells are spaced apart from each other by a predetermined distance to remove heat generated during charge and discharge of the unit cells. For example, the battery cells are sequentially stacked so that the battery cells are spaced apart from each other by a predetermined distance without using additional members. For battery cells having a low mechanical strength, on the other hand, one or more battery cells are mounted in a predetermined mounting member and a plurality of mounting members are stacked to constitute a battery module. In the present invention, the latter is referred to as a 'unit module.'

In a case in which a plurality of unit modules is stacked to constitute a battery module, coolant flow channels are formed between the battery cells and/or between the unit modules to effectively remove heat accumulating between the stacked battery cells.

For reference, the term 'battery module' used in this specification comprehensively means a battery system constructed to have a structure in which two or more chargeable and dischargeable battery cells or unit modules are mechanically coupled to each other and, at the same time, electrically connected to each other to provide high power and large capacity. Therefore, a battery module itself may constitute a whole apparatus or a part of a large-sized apparatus. For example, a large number of small-sized battery modules may be connected to each other to constitute a large-sized battery module, or a plurality of unit modules, each including a small number of battery cells, may be connected to each other.

In the above, the spacing distance for coolant flow between the unit cells may be set based on various factors, such as the size of each of the unit cells, flow rate of the coolant per unit time, and the size of the coolant introduction part. For example, the spacing distance may be equivalent to 0.1 to 1 times the thickness of each of the unit cells.

Meanwhile, each of the unit modules may be configured to have various structures. A preferred example will be described hereinafter.

Each of the unit modules is configured to have a structure in which plate-shaped battery cells, each of which has electrode terminals formed at the upper and lower ends thereof, are connected in series to each other. Each of the unit modules may include two or more battery cells, connection parts connecting the electrode terminals of which are bent so that the battery cells are stacked and high-strength cell covers configured to be coupled to each other to cover outer sides of the respective battery cells excluding the electrode terminals.

Each of the plate-shaped battery cells is a battery cell having small thickness and relatively large width and length so as to minimize the total size of a battery module when the battery cells are stacked to constitute the battery module. In a preferred example, each of the battery cells may be a secondary battery configured to have a structure in which an electrode assembly is mounted in a battery case formed of a laminate sheet including a resin layer and a metal layer, and electrode terminals protrude from the upper and lower ends of the battery case. Specifically, the electrode assembly may be mounted in a pouch-shaped case formed of an aluminum laminate sheet. The secondary battery with the above-described structure may also be referred to as a pouch-shaped battery cell.

Two or more battery cells may be covered by the high-strength cell covers made of a synthetic resin or a metal material to constitute a unit module. The high-strength cell covers protect the battery cells exhibiting low mechanical strength and restrain the repetitive expansion and contraction fluctuation during the charge and discharge of the battery cells to prevent separation between sealed portions of the battery cells. Consequently, it is possible to manufacture a middle or large-sized battery module exhibiting higher safety.

The battery cells are connected in series and/or parallel to each other in each of the unit modules or between neighboring unit modules. In a preferred example, the battery cells are arranged in series in the longitudinal direction so that the electrode terminals of the battery cells are successively adjacent to each other, neighboring electrode terminals of the battery cells are coupled to each other, two or more of the battery cells are overlapped with each other, and a predetermined number of overlapped battery cells are covered by the cell covers to manufacture a plurality of unit modules.

The coupling between the electrode terminals may be achieved using various methods, such as welding, soldering, and mechanical fastening. Preferably, the coupling between the electrode terminals is achieved by welding.

The battery pack is configured to have a structure in which a width (a vertical width) of the battery pack is twice or more a height of the battery pack. Consequently, it is possible to manufacture the battery pack to have a plate-shaped structure, and therefore, it is possible to easily install the battery pack in a space having a small height and a relatively large width, such as a lower space of a vehicle.

The coolant inlet port and the coolant outlet port are portions through which a coolant to effectively remove heat generated from the battery cells during charge and discharge of the battery cells is introduced and discharged, respectively. In a preferred example, the coolant inlet port and the coolant outlet port may be located at the same side or opposite sides of the pack case. That is, the coolant inlet port and the coolant outlet port may be located at the same side or opposite sides of the pack case based on an installation space of a vehicle in which the battery pack is installed.

In another preferred example, the coolant inlet port and the coolant outlet port may be formed in a symmetrical or asymmetrical fashion in the horizontal direction (the X direction) on the plane based on the installation space of the vehicle.

Preferably, the inside of one side of the coolant introduction part facing one side of the battery module group is configured to have a structure in which the distance between the inside of one side of the coolant introduction part and one side of the battery module group is decreased toward the end opposite to the coolant inlet port.

The distance between the inside of one side of the coolant introduction part and one side of the battery module group may be continuously or discontinuously decreased toward the end opposite to the coolant inlet port. Here, the expression 'the discontinuous decrease' means that a region substantially having an inclination of 0 degrees is provided at a region of the inside of one side of the coolant introduction part contiguous to one side of the battery module group. For example, a region having an inclination of 0 degrees with respect to one side of the battery module group may be partially formed between the inside of one side of the coolant introduction part and one side of the battery module group.

The structure in which the distance between the inside of one side of the coolant introduction part and one side of the battery module group is decreased toward the end opposite to the coolant inlet port may be variously modified.

In a preferred example, the inside of one side of the coolant introduction part may be configured to have a structure in which the distance between the inside of one side of the coolant introduction part and one side of the battery module group is decreased toward the end opposite to the coolant inlet port in a stepwise pattern. In this structure, a component, such as an electronic part, may be effectively installed in an internal space of the battery pack, through which flow channels do not extend.

In another preferred example, the inside of one side of the coolant introduction part may be configured to have a structure comprising two or more continuous incline planes.

Specifically, the incline planes of the inside of one side of the coolant introduction part may include a first incline plane starting from the end opposite to the coolant inlet port and a second incline plane provided between the first incline plane and the coolant inlet port so that the second incline plane has an inclination greater than that of the first incline plane.

According to circumstances, the battery pack may be configured to have a structure in which the battery module group comprises battery modules groups (a left battery module group and a right battery module group) arranged at opposite sides on the plane from the coolant introduction part, and the coolant flow channel diverges in the horizontal direction (the X direction) W on the plane so that the coolant can be introduced into the left battery module group and the right battery module group.

Also, the battery pack may be configured so that two or more of the battery modules are arranged in the vertical direction (the Y direction) on the plane based on desired capacity of the battery pack.

In an example of the above-described structure, the battery modules may be continuously arranged in a state in which the coolant flow channels corresponding to the respective battery modules communicate with each other. Consequently, the direction in which the coolant passes through the coolant flow channels is not curved, and therefore, it is possible for the coolant to effectively coo the battery modules.

The structure of the coolant introduction part is not particularly restricted so long as the coolant introduction part improves battery module cooling efficiency. For example, the coolant introduction part may include two or more coolant introduction parts formed in the vertical direction (the Y direction) on the plane. Consequently, it is possible to further improve cooling efficiency as compared with a cooling structure having only one coolant introduction part.

In the above-described structure, the coolant flow channels of the coolant introduction parts diverge from the coolant inlet port. Consequently, it is possible to uniformly cool the battery modules through the respective coolant introduction parts.

In another example, the coolant introduction part may include coolant introduction part formed at the respective battery modules arranged in the vertical direction (the Y direction) on the plane. Consequently, it is possible to maximize battery module cooling efficiency.

According to circumstances, an electronic member may be further installed in an internal space of the pack case defined by the inclined structure of the inside of one side of the coolant introduction part. Consequently, it is possible to maximize utilization of the internal space of the pack case.

Each of the battery cells is not particularly restricted so long as each of the battery cells is a battery that can be charged and discharged. For example, each of the battery cells may be a secondary battery having a cathode, an anode, a separator and an electrolyte mounted in a hermetically sealed container so that the secondary battery can be charged and discharged. In the present invention, a preferred unit battery may be a lithium ion secondary battery, a lithium ion polymer secondary battery, or a nickel metal hydride secondary battery.

As previously described, the battery cells are spaced apart from each other so that the coolant can flow through gaps defined between the battery cells. According to circumstances, the unit batteries may be configured to have a specific interval or arrangement so that the coolant can efficiently flow. The coolant flows through such spacing portions (gaps) to remove heat generated from the battery cells.

In the present invention, the coolant is not particularly restricted so long as the coolant is a fluid that is capable of cooling the battery cells. The coolant may be air or water. Preferably, the coolant is air. The coolant may be supplied by an additional device, such as a fan, and introduced into the coolant inlet port of the battery pack according to the present invention. However, a means to drive the coolant is not limited by the fan.

In accordance with another aspect of the present invention, there is provided a vehicle including the battery pack with the above-stated construction as a power source.

The vehicle may be an electric vehicle, a hybrid electric vehicle, or a plug-in hybrid electric vehicle which includes a plurality of battery cells to achieve high power and large capacity, and therefore, in which high-temperature heat generated during charge and discharge of the battery cells is a serious safety concern.

In accordance with a further aspect of the present invention, there is provided a vehicle in which a battery pack having a specific structure is mounted.

Specifically, the vehicle includes a battery pack having the following structure as a power source. The battery pack is configured to have a structure in which a plurality of hexahedral battery modules, the number of which corresponds to an area of a battery pack installation space in the vehicle, is arranged in a horizontal direction (an X direction) and a vertical direction (a Y direction) on the plane in a state in which the battery modules are spaced apart from each other so that a coolant flow channel is defined between the battery modules, a pack case is formed in a shape corresponding to the battery pack installation space in the vehicle, the battery modules being arranged so as to correspond to an internal space of the pack case, and a coolant to remove heat generated from the battery modules is introduced through at least one side of the pack case, passes through the battery modules in the vertical direction (the Y direction) on the plane, flows in the horizontal direction (the X direction) on the plane, and is discharged through the other side of the pack case.

Consequently, the battery pack exhibiting high cooling efficiency can be installed in the lower part of the vehicle, thereby maximizing utilization of the internal space of the vehicle and exhibiting high safety.

BRIEF DESCRIPTION OF THE DRAWINGS

The above and other objects, features and other advantages of the present invention will be more clearly understood from the following detailed description taken in conjunction with the accompanying drawings, in which.

BEST MODE

Now, preferred embodiments of the present invention will be described in detail with reference to the accompanying drawings. It should be noted, however, that the scope of the present invention is not limited by the illustrated embodiments.

Figure 1:
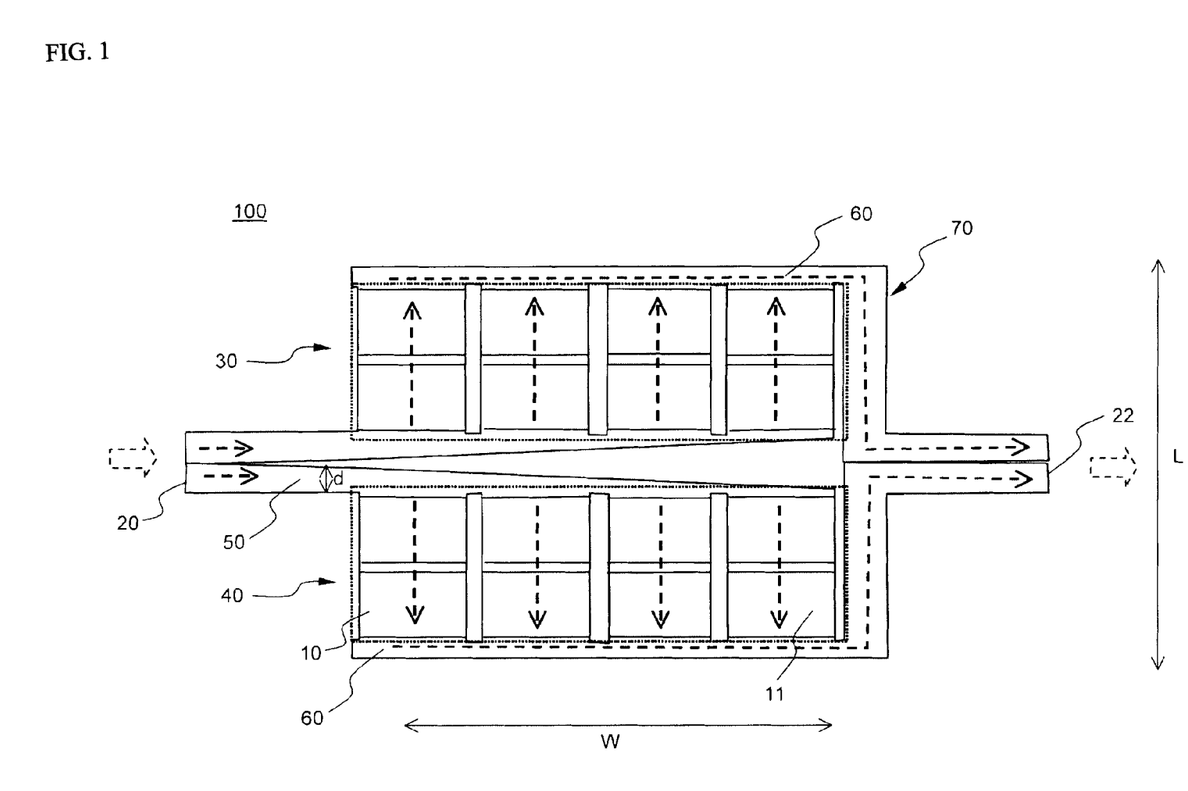
FIG. 1 is a plan view typically showing a battery pack according to an embodiment of the present invention.
Figure 2:
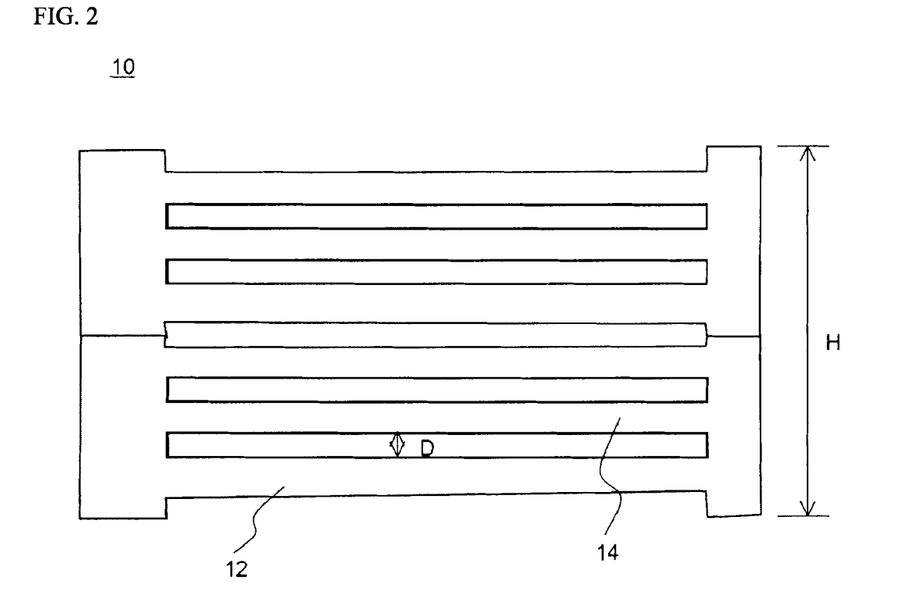
FIG. 2 is a front view typically showing a battery module of FIG. 1.
Figure 3:
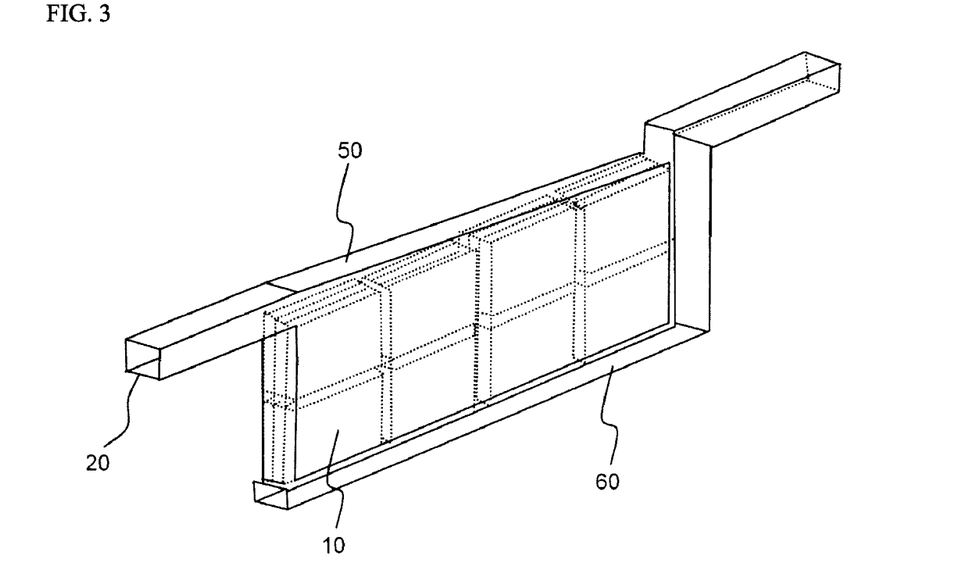
FIG. 3 is a perspective view showing a battery module group of FIG. 1.

FIG. 1 is a plan view typically showing a battery pack according to an embodiment of the present invention, FIG. 2 is a front view typically showing a battery module of FIG. 1, and FIG. 3 is a perspective view typically showing a battery module group of FIG. 1. For convenience of understanding, the battery module group is shown as being erected with respect to the ground in FIG. 3.

Referring to these drawings, a battery pack 100 includes battery module groups 30 and 40 arranged in a horizontal direction (an X direction) W on the plane with respect to a coolant introduction direction in which a coolant is introduced through coolant inlet ports 20, and pack cases 70 having flow spaces, i.e. coolant introduction parts 50, extending from the coolant inlet ports 20 to the battery module groups 30 and 40 and flow spaces, i.e. coolant discharge parts 60, extending from the battery module groups 30 and 40 to coolant outlet ports 22.

Specifically, 16 battery modules 10 constitute a left battery module group 30 and a right battery module group 40 at opposite sides on the plane from the coolant introduction parts 50 in the horizontal direction (the X direction) W on the plane in a state in which flow of the coolant is restrained. Coolant flow channels diverge from the coolant introduction parts 50 in the horizontal direction (the X direction) W on the plane so that the coolant can be introduced into the left battery module group 30 and the right battery module group 40.

Also, each of the battery module groups 30 and 40 is configured so that the battery modules 10 are continuously arranged in a vertical direction (a Y direction) L on the plane in pairs in a state in which the coolant flow channels communicate with each other.

Consequently, the battery pack 100 is generally configured to have a structure in which the width L of the battery pack 100 is twice or more the height H of the battery pack 100.

The coolant flow channels between the coolant introduction parts 50 and the coolant discharge parts 60 are configured to have a structure in which the coolant, introduced through the coolant introduction parts 50, cools the battery modules 10 while passing through the battery modules 10 in the vertical direction (the Y direction) L on the plane and is discharged through the coolant discharge parts 60. The coolant flow channels of the coolant introduction parts 50 diverge from the coolant inlet ports 20, and therefore, the coolant introduction parts 50 are substantially formed with respect to the battery modules 10 arranged in the vertical direction (the Y direction) L on the plane.

The coolant inlet ports 20 and the coolant outlet ports 22 are disposed at opposite sides of the pack cases 70. The coolant inlet ports 20 and the coolant outlet ports 22 are formed in a symmetrical fashion in the horizontal direction (the X direction) W on the plane.

The inside of one side of the coolant introduction part 50 facing one side of each of the battery module groups 30 and 40 is configured to have a structure in which a distance d between the inside of one side of the coolant introduction part 50 and one side of each of the battery module groups 30 and 40 is decreased toward the end opposite to the coolant inlet port 20.

Each of the battery modules 10 is configured to have a structure in which unit cells 12 are stacked in a direction (a Z direction) H in which the unit cells 12 are sequentially stacked in parallel to the ground in a state in which a spacing distance D for coolant flow is provided between the respective unit cells 12 (see FIG. 2).

That is, the spacing distance between the respective unit cells 12 is parallel to the direction in which the flow channel extends. Although the coolant is not uniformly introduced to the outermost battery module 11 in the horizontal direction (the X direction) W on the plane, therefore, the deviation in temperature of the unit cells 12 in at least one of the battery modules 10 is uniform.

FIGS. 4 to 8 are plan views typically showing battery packs according to various embodiments of the present invention.

Figure 4:
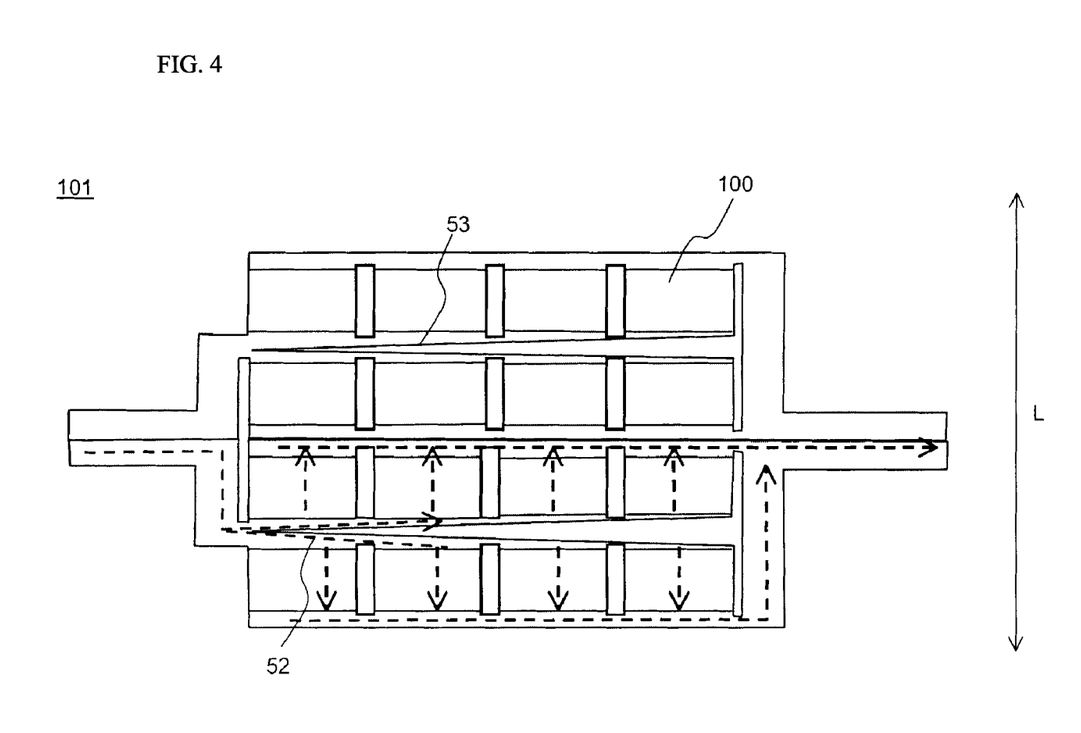
FIGS. 4 to 8 are plan views typically showing battery packs according to various embodiments of the present invention.

Referring to FIG. 4, a battery pack 101 is configured to have a structure in which two coolant introduction parts 52 and 53 are formed in a vertical direction (a Y direction) L on the plane, and a coolant is introduced into battery module groups arranged at opposite sides (a left side and a right side) of the coolant introduction parts 52 and 53 from the coolant introduction parts 52 and 53.

Generally, the coolant introduction parts 52 and 53 are formed with respect to battery modules 10 in the vertical direction (the Y direction) L on the plane, and coolant discharge parts disposed at the middle region of the battery pack are adjacent to each other.

Figure 5:
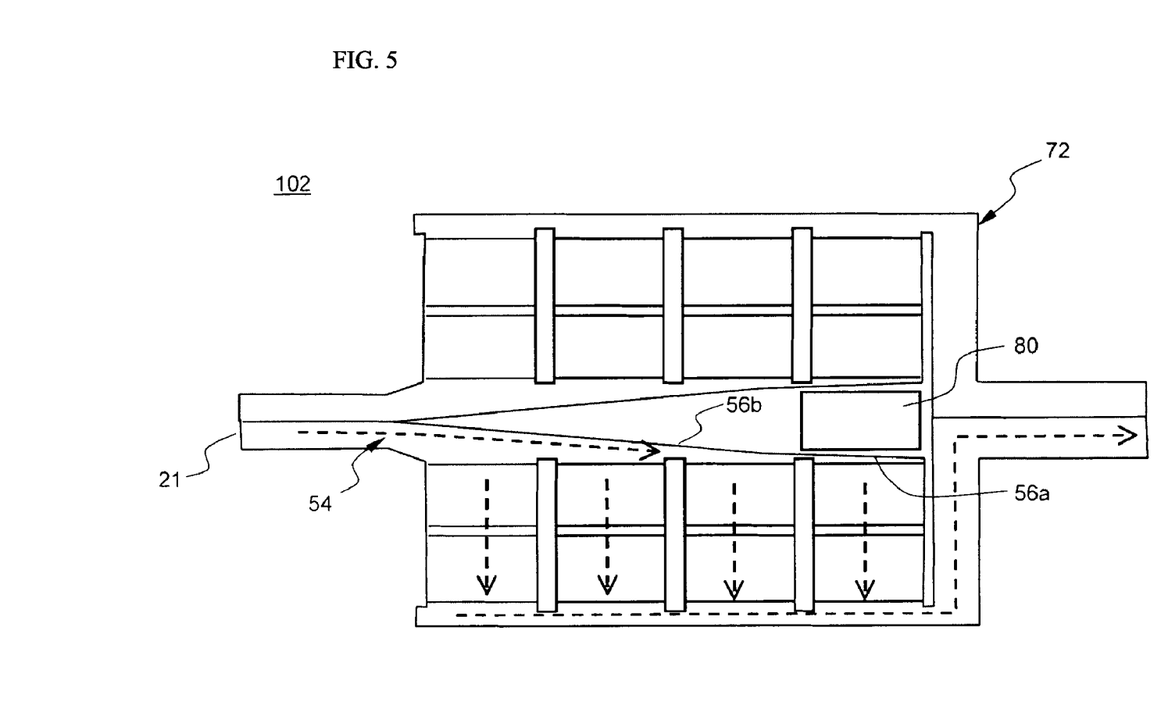

In a battery pack 102 of FIG. 5, the inside of one side of a coolant introduction part 54 includes two continuous incline planes. The incline planes of the inside of one side of the coolant introduction part include a first incline plane 56a starting from the end opposite to a coolant inlet port 21 and a second incline plane 56b provided between the first incline plane 56a and the coolant inlet port 21 so that the second incline plane 56b has an inclination greater than that of the first incline plane 56a.

Also, an electronic member 80 is further installed in an internal space of a pack case 72 defined by the inclined structure of the inside of one side of the coolant introduction part 54. As a result, it is possible for the battery pack to exhibit high space utilization.

Figure 6:
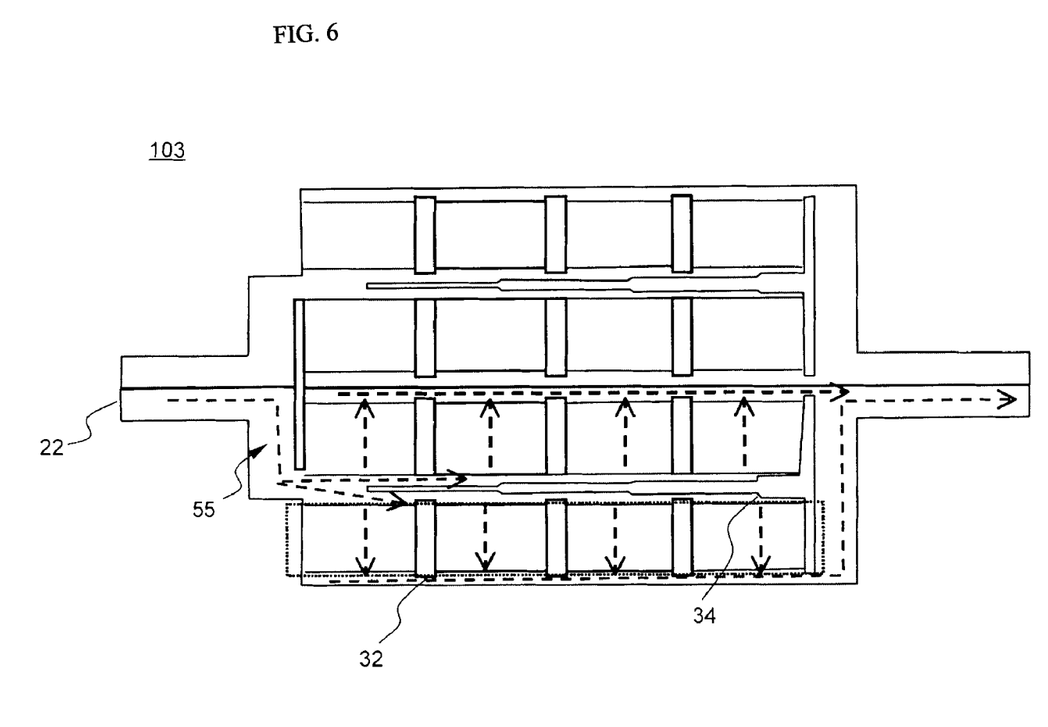

A battery pack 103 of FIG. 6 is identical in structure to the battery pack 101 of FIG. 4 except that the inside of one side of a coolant introduction part 55 is configured to have a structure in which the distance between the inside of one side of the coolant introduction part 55 and one side of a battery module group 32 is decreased toward the end opposite to a coolant inlet port 22 in a stepwise pattern 34.

Figure 7:
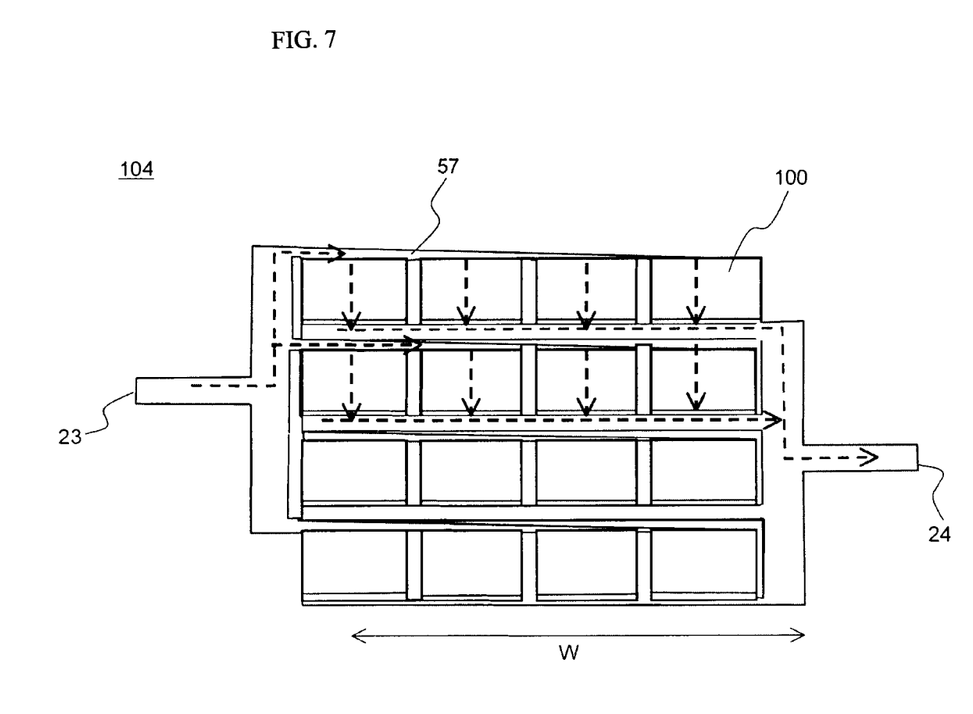

In a battery pack 104 of FIG. 7, a coolant inlet port 23 and a coolant outlet port 24 are formed in an asymmetrical fashion in a horizontal direction (an X direction) W on the plane. That is, a coolant introduction part 57 does not diverge so that a coolant can be supplied only to a specific battery module group through the coolant introduction part 57.

Figure 8:
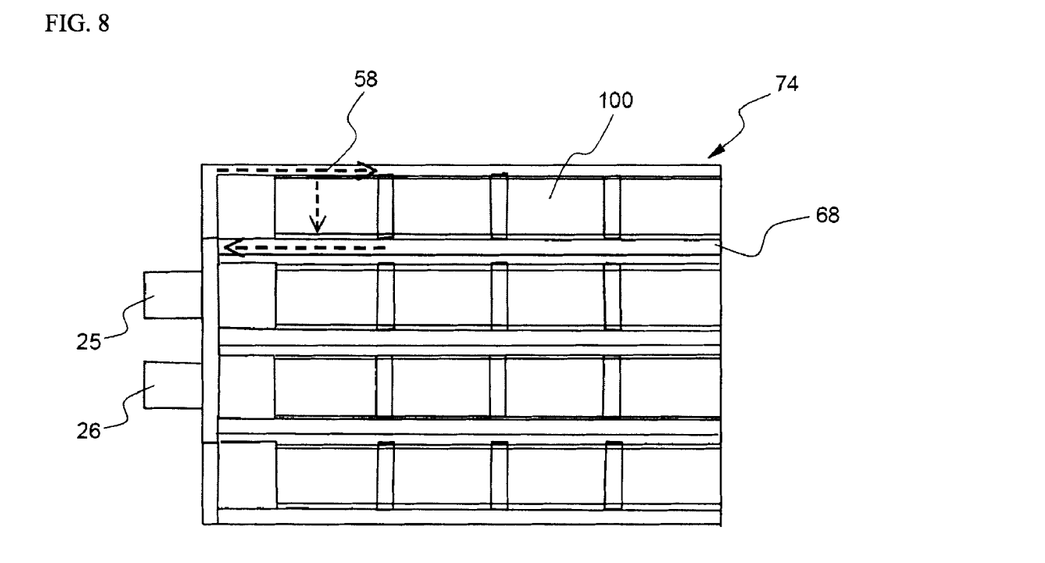
Figure 9:
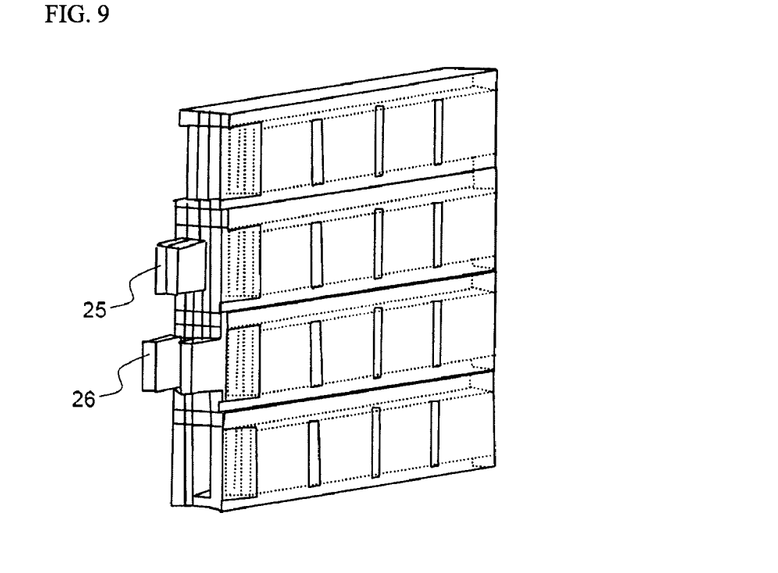
FIG. 9 is a perspective view of FIG. 8.

FIG. 8 is a plan view typically showing a battery pack according to a further embodiment of the present invention, and FIG. 9 is a perspective view of FIG. 8.

Referring to these drawings, a coolant inlet port 25 and a coolant outlet port 26 are located at the same side of a pack case 74. That is, a direction in which a coolant flows in a coolant discharge part 68 is opposite to a direction in which the coolant flows in a coolant introduction part 58 so that the coolant, introduced from the coolant introduction part 58, can pass through battery modules 100 and move in the direction indicated by an arrow.

As described above, therefore, the battery pack according to the present invention is configured to have a structure in which the number of the battery modules can be variously changed based on the size of the battery pack so that the battery modules can be arranged in a matrix pattern, and the battery modules are connected in pairs along each of the arrangements to form flow channels or rows of the battery modules are separately configured to easily form flow channels.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As is apparent from the above description, the battery pack according to the present invention is configured to have a plate-shaped structure in which the width of the battery pack is greater than the height of the battery pack, and therefore, it is possible to install the battery pack in the lower part of a vehicle. As a result, the interior space of the vehicle is increased, and therefore, convenience is improved upon installing the battery pack in the vehicle.

Also, the coolant flow channel between the coolant introduction part and the coolant discharge part is configured to have a structure in which a coolant, introduced through the coolant introduction part, cools the battery modules while passing through the specific battery modules in the vertical direction (the Y direction) on the plane and is discharged through the coolant discharge part. Consequently, it is possible to uniformly distribute the coolant flowing in the flow channels defined between the battery cells, thereby effectively removing heat accumulating between the battery cells and greatly improving the performance and life span of the battery cells.

The invention claimed is:

1. A battery pack having a plurality of battery cells or unit modules ('unit cells'), which can be charged and discharged, mounted in a pack case, wherein
   the unit cells are stacked in a direction (a Z direction) in which the unit cells are sequentially stacked in parallel to a ground in a state in which a spacing distance for coolant flow is provided between the respective unit cells to constitute a battery module,
   two or more battery modules are arranged in a horizontal direction (an X direction) on the plane with respect to a coolant introduction direction in which a coolant is introduced through a coolant inlet port in a state in which flow of the coolant between the battery modules is restrained to constitute a battery module group,
   the pack case is provided with a flow space ('a coolant introduction part') extending from the coolant inlet port to the battery module group and another flow space ('a coolant discharge part') extending from the battery module group to a coolant outlet port,
   a coolant flow channel defined between the coolant introduction part and the coolant discharge part is configured to have a structure in which the coolant, introduced through the coolant introduction part, cools the battery modules while passing through the specific battery modules in a vertical direction (a Y direction) on the plane and is discharged through the coolant discharge part,
   the battery module group comprises battery modules groups (a left battery module group and a right battery module group) arranged at opposite sides on the plane from the coolant introduction part, and the coolant flow channel diverges in the horizontal direction (the X direction) W on the plane so that the coolant can be introduced into the left battery module group and the right battery module group, an inside of one side of the coolant introduction part facing one side of the battery module group is configured to have a structure in which a distance between the inside of one side of the coolant introduction part and one side of the battery module group is decreased toward an end opposite to the coolant inlet port, and an electronic member is installed in an internal space of the pack case defined by the inclined structure of the inside of one side of the coolant introduction part, and the flow channels do not extend through the internal space.

2. The battery pack according to claim 1, wherein the battery pack is configured to have a structure in which a width (a vertical width) of the battery pack is twice or more a height of the battery pack.

3. The battery pack according to claim 1, wherein the coolant inlet port and the coolant outlet port are located at the same side or opposite sides of the pack case.

4. The battery pack according to claim 1, wherein the coolant inlet port and the coolant outlet port are formed in a symmetrical or asymmetrical fashion in the horizontal direction (the X direction) on the plane.

5. The battery pack according to claim 1, wherein the inside of one side of the coolant introduction part is configured to have a structure in which the distance between the inside of one side of the coolant introduction part and one side of the battery module group is decreased toward the end opposite to the coolant inlet port in a stepwise pattern.

6. The battery pack according to claim 1, wherein the inside of one side of the coolant introduction part is configured to have a structure comprising two or more continuous incline planes.

7. The battery pack according to claim 6, wherein the incline planes of the inside of one side of the coolant introduction part comprise a first incline plane starting from the end opposite to the coolant inlet port and a second incline plane provided between the first incline plane and the coolant inlet port so that the second incline plane has an inclination greater than that of the first incline plane.

8. The battery pack according to claim 1, wherein two or more of the battery modules are arranged in the vertical direction (the Y direction) on the plane.

9. The battery pack according to claim 8, wherein the battery modules are continuously arranged in a state in which the coolant flow channels corresponding to the respective battery modules communicate with each other.

10. The battery pack according to claim 8, wherein the coolant introduction part comprises two or more coolant introduction parts formed in the vertical direction (the Y direction) on the plane.

11. The battery pack according to claim 10, wherein the coolant flow channels of the coolant introduction parts diverge from the coolant inlet port.

12. The battery pack according to claim 8, wherein the coolant introduction part comprises coolant introduction part formed at the respective battery modules arranged in the vertical direction (the Y direction) on the plane.

13. The battery pack according to claim 1, wherein each of the battery cells is a lithium ion secondary battery, a lithium ion polymer secondary battery, or a nickel metal hydride secondary battery.

14. The battery pack according to claim 1, wherein the coolant is air.

15. A vehicle comprising a battery pack according to claim 1 as a power source.

16. The vehicle according to claim 15, wherein the vehicle is an electric vehicle, a hybrid electric vehicle, or a plug-in hybrid electric vehicle.

17. A vehicle comprising a battery pack as a power source, wherein the battery pack is configured to have a structure in which a plurality of hexahedral battery modules, the number of which corresponds to an area of a battery pack installation space in the vehicle, is arranged in a horizontal direction (an X direction) and a vertical direction (a Y direction) on the plane in a state in which the battery modules are spaced apart from each other so that a coolant flow channel is defined between the battery modules, a pack case is formed in a shape corresponding to the battery pack installation space in the vehicle, the battery modules being arranged so as to correspond to an internal space of the pack case, two or more battery modules are arranged in a horizontal direction (an X direction) on the plane with respect to a coolant introduction direction in which a coolant is introduced through a coolant inlet port in a state in which flow of the coolant between the battery modules is restrained to constitute a battery module group, the battery module group comprises battery modules groups (a left battery module group and a right battery module group) arranged at opposite sides on the plane from a flow space ('a coolant introduction part') extending from the coolant inlet port to the battery module group, and the coolant flow channel diverges in the horizontal direction (the X direction) W on the plane so that the coolant can be introduced into the left battery module group and the right battery module group, a coolant to remove heat generated from the battery modules is introduced through at least one side of the pack case, passes through the battery modules in the vertical direction (the Y direction) on the plane, flows in the horizontal direction (the X direction) on the plane, and is discharged through the other side of the pack case, an inside of one side of the coolant introduction part facing one side of the battery module group is configured to have a structure in which a distance between the inside of one side of the coolant introduction part and one side of the battery module group is decreased toward an end opposite to the coolant inlet port, and an electronic member is installed in an internal space of the pack case defined by the inclined structure of the inside of one side of the coolant introduction part, and the flow channels do not extend through the internal space.

18. A battery pack having a plurality of battery cells or unit modules ('unit cells'), which can be charged and discharged, mounted in a pack case, wherein the unit cells are stacked in a direction (a Z direction) in which the unit cells are sequentially stacked in parallel to a ground in a state in which a spacing distance for coolant flow is provided between the respective unit cells to constitute a battery module, two or more battery modules are arranged in a horizontal direction (an X direction) on the plane with respect to a coolant introduction direction in which a coolant is introduced through a coolant inlet port in a state in which flow of the coolant between the battery modules is restrained to constitute a battery module group, the pack case is provided with a flow space ('a coolant introduction part') extending from the coolant inlet port to the battery module group and another flow space ('a coolant discharge part') extending from the battery module group to a coolant outlet port, a coolant flow channel defined between the coolant introduction part and the coolant discharge part is configured to have a structure in which the coolant, introduced through the coolant introduction part, cools the battery modules while passing through the specific battery modules in a vertical direction (a Y direction) on the plane and is discharged through the coolant discharge part, two or more of the battery modules are arranged in the vertical direction (the Y direction) on the plane, the coolant introduction part comprises two or more coolant introduction parts formed in the vertical direction (the Y direction) on the plane, the coolant flow channels of the coolant introduction parts diverge from the coolant inlet port, an inside of one side of the one or more coolant introduction parts facing one side of the battery module group is configured to have a structure in which a distance between the inside of one side of the coolant introduction part and one side of the battery module group is decreased toward an end opposite to the coolant inlet port, and an electronic member is installed in an internal space of the pack case defined by the inclined structure of the inside of one side of the coolant introduction part, and the flow channels do not extend through the internal space.

19. A battery pack having a plurality of battery cells or unit modules ('unit cells'), which can be charged and discharged, mounted in a pack case, wherein the unit cells are stacked in a direction (a Z direction) in which the unit cells are sequentially stacked in parallel to a ground in a state in which a spacing distance for coolant flow is provided between the respective unit cells to constitute a battery module, two or more battery modules are arranged in a horizontal direction (an X direction) on the plane with respect to a coolant introduction direction in which a coolant is introduced through a coolant inlet port in a state in which flow of the coolant between the battery modules is restrained to constitute a battery module group, the pack case is provided with a flow space ('a coolant introduction part') extending from the coolant inlet port to the battery module group and another flow space ('a coolant discharge part') extending from the battery module group to a coolant outlet port, a coolant flow channel defined between the coolant introduction part and the coolant discharge part is configured to have a structure in which the coolant, introduced through the coolant introduction part, cools the battery modules while passing through the specific battery modules in a vertical direction (a Y direction) on the plane and is discharged through the coolant discharge part, two or more of the battery modules are arranged in the vertical direction (the Y direction) on the plane, the coolant introduction part comprises coolant introduction part formed at the respective battery modules arranged in the vertical direction (the Y direction) on the plane, an inside of one side of the one or more coolant introduction parts facing one side of the battery module group is configured to have a structure in which a distance between the inside of one side of the coolant introduction part and one side of the battery module group is decreased toward an end opposite to the coolant inlet port, and an electronic member is installed in an internal space of the pack case defined by the inclined structure of the inside of one side of the coolant introduction part, and the flow channels do not extend through the internal space.

20. A battery pack having a plurality of battery cells or unit modules ('unit cells'), which can be charged and discharged, mounted in a pack case, wherein the unit cells are stacked in a direction (a Z direction) in which the unit cells are sequentially stacked in parallel to a ground in a state in which a spacing distance for coolant flow is provided between the respective unit cells to constitute a battery module, two or more battery modules are arranged in a horizontal direction (an X direction) on the plane with respect to a coolant introduction direction in which a coolant is introduced through a coolant inlet port in a state in which flow of the coolant between the battery modules is restrained to constitute a battery module group, the pack case is provided with a flow space ('a coolant introduction part') extending from the coolant inlet port to the battery module group and another flow space ('a coolant discharge part') extending from the battery module group to a coolant outlet port, a coolant flow channel defined between the coolant introduction part and the coolant discharge part is configured to have a structure in which the coolant, introduced through the coolant introduction part, cools the battery modules while passing through the specific battery modules in a vertical direction (a Y direction) on the plane and is discharged through the coolant discharge part, an inside of one side of the coolant introduction part facing one side of the battery module group is configured to have a structure in which a distance between the inside of one side of the coolant introduction part and one side of the battery module group is decreased toward an end opposite to the coolant inlet port, and an electronic member is further installed in an internal space of the pack case defined by the inclined structure of the inside of one side of the coolant introduction part, and the flow channels do not extend through the internal space.

* * * * *